United States Patent
Liu et al.

(10) Patent No.: US 9,208,572 B2
(45) Date of Patent: *Dec. 8, 2015

(54) SYSTEMS AND METHODS FOR IMAGE SEGMENTATION USING A DEFORMABLE ATLAS

(71) Applicant: General Electric Company, Schenectady, NY (US)

(72) Inventors: Xiaofeng Liu, Niskayuna, NY (US); Albert Montillo, Niskayuna, NY (US); Ek Tsoon Tan, Mechanicville, NY (US); John F. Schenck, Voorheesville, NY (US)

(73) Assignee: General Electric Company, Niskayuna, NY (US)

( * ) Notice: Subject to any disclaimer, the term of this patent is extended or adjusted under 35 U.S.C. 154(b) by 36 days.

This patent is subject to a terminal disclaimer.

(21) Appl. No.: 14/032,877

(22) Filed: Sep. 20, 2013

(65) Prior Publication Data
US 2015/0086096 A1 Mar. 26, 2015

(51) Int. Cl.
*G06K 9/00* (2006.01)
*G06K 9/34* (2006.01)
*G06T 7/00* (2006.01)

(52) U.S. Cl.
CPC ............. *G06T 7/0089* (2013.01); *G06T 7/0081* (2013.01); *G06T 2207/10088* (2013.01); *G06T 2207/20128* (2013.01); *G06T 2207/30016* (2013.01)

(58) Field of Classification Search
CPC ............................................ G06T 2207/20128
See application file for complete search history.

(56) References Cited

U.S. PATENT DOCUMENTS

| | | | |
|---|---|---|---|
| 7,327,138 B2 | 2/2008 | Krieg et al. | |
| 7,623,709 B2 | 11/2009 | Gering | |
| 7,778,488 B2 | 8/2010 | Nord et al. | |
| 7,809,190 B2 | 10/2010 | Rousson et al. | |
| 8,073,216 B2 | 12/2011 | Dawant et al. | |
| 8,160,357 B2* | 4/2012 | Akinyemi et al. | 382/173 |
| 8,189,900 B2 | 5/2012 | Sammak et al. | |
| 2010/0322493 A1 | 12/2010 | Wei et al. | |
| 2012/0051607 A1 | 3/2012 | Nord et al. | |
| 2012/0281900 A1* | 11/2012 | Rueckert et al. | 382/131 |
| 2012/0281904 A1 | 11/2012 | Gong et al. | |
| 2014/0056501 A1* | 2/2014 | Du et al. | 382/131 |

OTHER PUBLICATIONS

Gholipour et al., "Multi-atlas multi-shape segmentation of fetal brain MRI for bolumetric and morphometric analysis of ventriculomegaly", NeuroImage 60 (2012) 1819-1831, available online Feb. 10, 2012.*

Kass, "Snakes: Active Contour Models", International Journal of Computer Visions, 321-331 (1988).

(Continued)

*Primary Examiner* — Soo Park
(74) *Attorney, Agent, or Firm* — Melissa K. Dobson

(57) ABSTRACT

Systems and methods for image segmentation using a deformable atlas are provided. One method includes obtaining one or more target images, obtaining one or more propagated label probabilities for the one or more target images, and segmenting the one or more target images using a cost function of a deformable atlas model. The method further includes identifying segmented structures within the one or more target images based on the segmented one or more target images.

18 Claims, 7 Drawing Sheets

(56) References Cited

OTHER PUBLICATIONS

Malladi, "Shape Modeling with Front Propagation: A Level Set Approach", IEEE Transactions on Pattern Analysis and Machine Intelligence, vol. 17, No. 2 (Feb. 1995).
Sabuncu, "A Generative Model for Image Segmentation Based on Label Fusion", IEEE Transactions on Medical Imaging, vol. 29, No. 10 (Oct. 2010).
Xu, "A Summary of Geometric Level-Set Analogues for a General Class of Parametric Active Contour and Surface Models", Workshop on Variational and Level Set Methods in Computer Vision (2001) 104-111.
Xu, "Image Segmentation Using Deformable Models", SPIE Handbook on Medical Imaging—vol. III: Medical Image Analysis, SPIE (2000).
Avants, "Symmetric Diffeomorphic Image Registration with Cross-Correlation: Evaluating Automated Labeling of Elderly and Neurodegenerative Brain", Med. Image Analysis (Feb. 2008).
Rousseau, "A Supervised Patch-Based Approach for Human Brain Labeling", IEEE Trans. Med. Imaging (Oct. 2011).
Liu, "Deformable Atlas for Multi-Structure Segmentation", General Electric Global Research Center, Niskayuna, NY.
Heckemann, "Automatic Anatomical Brain MRI Segmentation Combining Label Propagation and Decision Fusion", NeuroImage 33 (2006) pp. 115-126.
Artaechevarrai, "Combination Strategies in Multi-Atlas Image Segmentation: Application to Brain MR Data", IEEE Transactions on Medical Imaging, vol. 28, No. 8 (Aug. 2009).
Rosen, "The Gradient Projection Method for NonLinear Programming. Part II. NonLinear Constraints", J. Soc. Indust. Appl. Math. (1961) pp. 514-532.
Warfield, "Simultaneous Truth and Performance Level Estimation (STAPLE): An Algorithm for the Validation of Image Segmentation", IEEE Transactions on Medical Imaging, (Jul. 2004), pp. 903-921.

\* cited by examiner

SYSTEMS AND METHODS FOR IMAGE SEGMENTATION USING A DEFORMABLE ATLAS

BACKGROUND

Image segmentation is often used to identify regions of interest for use in medical image analysis. In particular, image segmentation is used to segment structures from the background and is often used as a first step for medical image analysis, such as for visualization, quantitative image analysis, and image guided intervention.

Image segmentation can be difficult to perform because of the large variability of shape and appearance of different structures, including the lack of contrast between adjacent or neighboring structures. Known image segmentation methods are generally divided into image-based approaches and atlas-based approaches. For example, image-based approaches segment based on image cues including intensity, gradient, and/or texture. Image based methods use different models that perforin generally well when structures of interest have prominent boundaries and the intensities of neighboring structures are different. However, these methods often perform poorly when these conditions are not met. In particular, it is often difficult to incorporate prior anatomical knowledge into these image-based approaches especially when applied to multi-structure segmentation.

Atlas-based approaches rely largely on prior knowledge about the spatial arrangement of structures. These approaches typically include first registering one or more manually segmented images, called atlases, to the subject image, called target, so that the manual segmentations on the atlases are propagated and fused. Compared to image-based approaches, these methods incorporate anatomical knowledge for improved performance, but are limited by large anatomical variation and imperfect registration.

Weighted fusion methods have also been proposed to improve performance where the segmentation fusion is weighted based on the intensity similarity between the target and the atlas images. However, information about structure intensity and contour that is specific to the subject's anatomy is not used, which makes it difficult to apply these methods to subjects with large anatomical differences from the atlases. Other methods have also been proposed and include an adaptive atlas method that allows large structure variation based on target image intensities. However, adaptive atlas methods do not consider structure boundary information, which means these methods cannot discriminate different structures that have similar intensities. Still other proposed methods use spectral label fusion that divides the target image into regions based on image intensities and contours, followed by voting on the regions using an atlas-based approach. However these methods are usually limited to a single anatomical region and would be difficult to extend to segment multiple regions simultaneously.

Thus, known segmentation methods suffer from different drawbacks as a result of using such an image based approaches or an atlas-based approaches.

BRIEF DESCRIPTION

In one embodiment, a non-transitory computer readable storage medium for segmenting an image using a processor is provided. The non-transitory computer readable storage medium includes instructions to command the processor to obtain one or more target images, obtain one or more propagated label probabilities for the one or more target images, and segment the one or more target images using a cost function of a deformable atlas model. The non-transitory computer readable storage medium further includes instructions to command the processor to identify segmented structures within the one or more target images based on the segmented target images.

In another embodiment, a Magnetic Resonance Imaging (MRI) system is provided that includes an imaging portion configured to acquire one or more target images of an object and a processing portion configured to determine one or more propagated label probabilities for the one or more target images. The processing portion further includes a deformable atlas module configured to segment the one or more target images using a cost function of a deformable atlas model to identify segmented structures within the one or more target images based on the segmented target images.

In another embodiment, a method for image segmentation is provided that includes obtaining one or more target images, obtaining one or more propagated label probabilities for the one or more target images, and segmenting the one or more target images using a cost function of a deformable atlas model. The method also includes identifying segmented structures within the one or more target images based on the segmented one or more target images.

DETAILED DESCRIPTION

Figure 1:
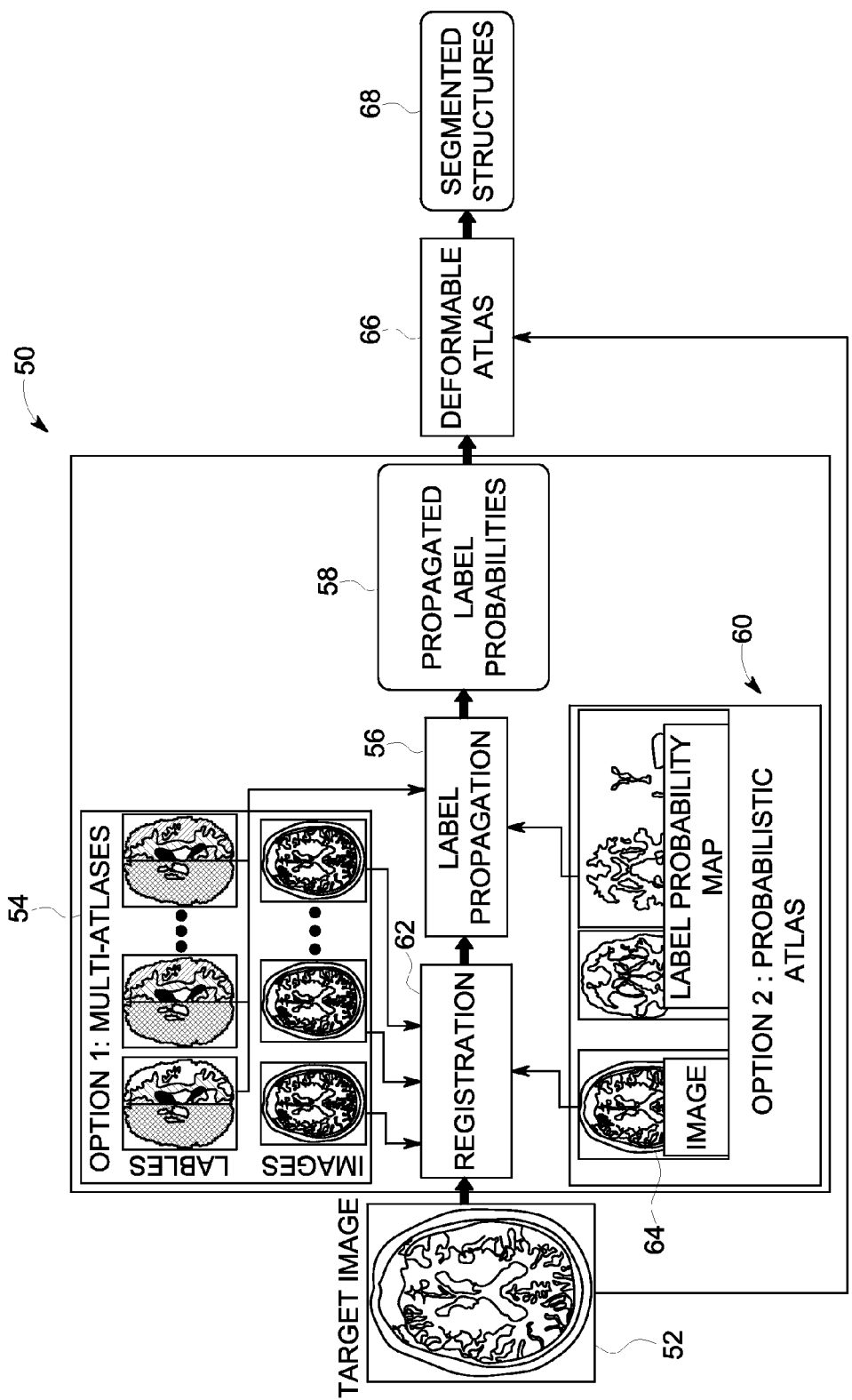
FIG. 1 is a diagram illustrating a process flow for image segmentation in accordance with various embodiments.

Various embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors, controllers, or memories) may be implemented in a single piece of hardware (e.g., a general purpose signal processor or random access memory, hard disk, or the like) or multiple pieces of hardware. Similarly, any programs may be stand-alone programs, may be incorporated as subroutines in an operating system, may be functions in an installed software package, and the like. It should be understood that the various embodiments are not limited to the arrangements and instrumentality shown in the drawings.

As used herein, the terms "system," "unit," or "module" may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. The modules or units shown in the attached figures may represent the hardware that operates based on software or hardwired instructions, the software that directs hardware to perform the operations, or a combination thereof.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments provide systems and methods for multi-structure segmentation. In particular, various embodiments provide a deformable atlas based segmentation that uses image-based processing or methods and atlas-based processing or methods. In some embodiments, a probabilistic framework is solved that incorporates prior anatomical knowledge with image cues that are specific to the target images, including structure intensity profiles and boundaries. The structure intensity distributions are modeled using kernel density functions and the structure boundary information is modeled in a way similar to deformable models and contributes to drive the segmentations toward the structure boundaries.

For example, one method formulates a probabilistic framework that combines prior anatomical knowledge with image-based cues that are specific to the subject's anatomy, and solves this framework using an expectation-maximization (EM) method. In a brain application, for example, the multi-structure segmentation of both normal and diseased brains provides improved results, particularly in diseased brains.

At least one technical effect of various embodiments is improved image segmentation over conventional image-based or atlas-based segmentation methods. At least one technical effect of various embodiments is improved segmentation performance around the structure boundaries and a more robust segmentation for large anatomical variation.

FIG. 1 illustrates a process flow 50 (or workflow) for a multi-structure segmentation using a deformable atlas approach in accordance with various embodiments. The process flow 50 may be performed to segment a set of structures from a given target image 52 using both the target image 52 and prior knowledge about the spatial arrangement of structures. The prior spatial knowledge can be generated in a plurality of different methods, two of which will be now be described. It should be noted that only one of these methods may be used or a combination thereof.

The first method (Option 1) includes a multi-atlas approach where a set of atlas images 54 are manually segmented and independently registered to the target image 52. The manual segmentations, or labels, are propagated (through a label propagation process 56, such as known in the art) and combined to generate propagated label probabilities 58, which in some embodiments, includes generating spatial label probabilistic maps on the target image 52 (e.g., showing possible structures of interest). The second method (Option 2) uses a spatial probabilistic atlas 60, where the spatial label probabilistic maps are generated in advance on the atlas image domain and are propagated (through the label propagation process 56) to the target image 52 after registering (using a registration process 62, such as known in the art) the (single) atlas image 64 to the target image 52. It should be noted that the process(es) or method(s) used to generate the propagated labels may be any suitable process or method and is not limited to the above-described methods. In general, any process that can generate spatial label probabilistic maps on the target image 52 may be used. Thus, the output from the above described process provides propagated label probabilities for the target image 52 (e.g., initial label or segment of structures within the target image 52).

Thereafter, the propagated label maps, as well as the target image 52 are input to a deformable atlas module 66 that implements a process, method, or algorithm to segment all (or a subset of) the structures in the target image 52 simultaneously or concurrently.

Figure 2:
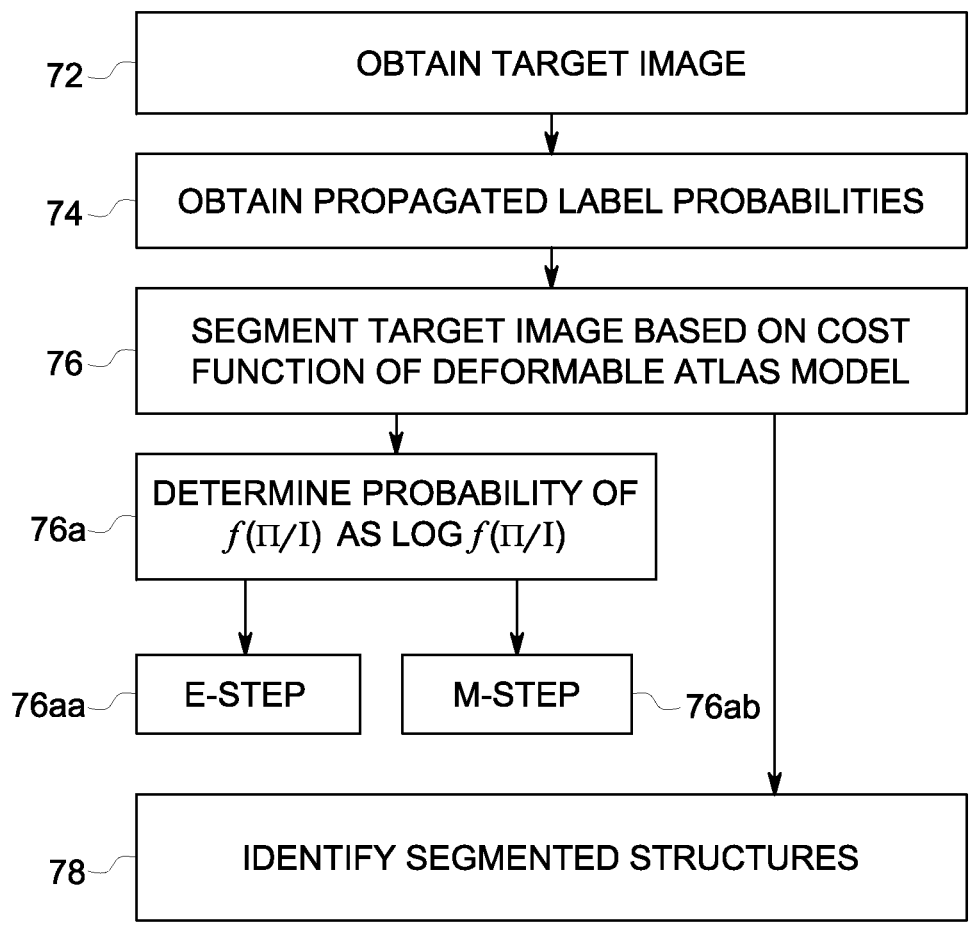
FIG. 2 is a flowchart of a method for image segmentation in accordance with an embodiment.

The deformable atlas module 66 then processes the input data to generate segmented structures using multi-structure segmentation as described in more detail herein. Specifically, a method 70 that may be performed to generate the segmented structures 68 is shown in FIG. 2. In various embodiments, the method 70, for example, may employ structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 70 may be able to be used as one or more algorithms to direct hardware to perform operations described herein.

The method 70 includes obtaining one or more target images at 72. For example, one or more Magnetic Resonance (MR) T1-weighted images may be acquired using an MRI system. It should be noted that different types of MR images may be acquired and T1-weighted images are merely used as an example. The MR images may be acquired using, for example, any known MR imaging technique in the art. It also should be noted that the various embodiments are not limited to MR images, and may be used with other medical images or non-medical images. Thus, for example, the various embodiments may be implemented in medical or non-medical applications (e.g., inspection systems).

The method 70 also includes obtaining propagated label probabilities at 74. For example, propagated label probabilities may be obtained as described in more detail herein, for example, as described in connection with FIG. 1.

With respect to steps 72 and 74, it should be noted that the deformable atlas module 66 generally receives as inputs the target image 52 and spatial priors about the structures. The spatial priors may be generated using, for example, a multi-atlas approach or a spatial probabilistic approach, which the deformable atlas module 66 uses to segment the multiple structures.

The method 70 also includes segmenting the target image 52 based on a cost function of a deformable atlas model at 76. As described in more detail below, a deformable model based term is used for multi-atlas based segmentation. In particular, a probability of the deformable model based term ($f(\pi|I)$) is determined at 76a as described below in more detail, such as determining the log probability thereof ($\log f(\pi|I)$). The determination based on the cost function of the deformable model includes in some embodiments using an EM algorithm, which iterates between the E-step (expectation step at 76aa) and the M-step (maximization step at 76ab). The details of the calculations and determinations will now be described.

Initially, it should also be noted that in the described embodiments, the target image 52 is denoted as I, where $I_j$ is the image intensity at voxel j and j∈{1, 2, ..., J}. The number of structures to be segmented or the number of labels is denoted as K. The true label at each voxel is represented by $z_j=[z_j1, \ldots, z_{jK}]$, where $z_{jk}=1$ if j belongs to structure k, and 0 otherwise. The label spatial prior is $f(z_j)=p_j=[p_{j1}, \ldots, p_{jK}]$. In a multi-atlas approach:

$$p_{jk} = \frac{1}{N}\sum_{n=1}^{N} L_{jk}^n \text{ with } L_{jk}^N$$

is the propagated label at j from the $n^{th}$ atlas and N is the number of atlases.

In a probabilistic atlas approach, $p_j$ is the propagated spatial prior after registration. In this embodiment, $\theta=\{\rho,\pi\}$ is the set of unknown parameters, where $\rho=\{\rho_1, \ldots \rho_K\}$ are the intensity distribution functions for the K structures, and $\pi=\{\pi_{jk}\}$ with $\pi_{jk}$ is the probability that voxel j belongs to structure k and for all j:

$$\Sigma_{k=1}^K \pi_{jk}=1$$

A general description of a deformable atlas method used in various embodiments will now first be provided followed by a more detailed description. The deformable atlas method of various embodiments uses a maximum likelihood expectation (MLE) framework that combines label spatial prior knowledge with image-based cues, such as intensities and edges. In particular, using Bayes' law, the likelihood function is expressed as $$f(Z,I|\theta)=f(I|Z,\theta)f(Z|\theta) \propto f(I|Z,\rho)f(I|Z,\pi)f(Z|\theta) \propto f(I|Z,\rho)f(\pi|I)f(Z|\pi) \quad (1)$$

with the assumptions that ρ and π are independent, Z and ρ are independent, and I and Z are conditionally independent given π. The term $f(Z,I|\rho)$ is based on the structure intensity profiles in the target image 52, while $f(\pi|I)$ models the distribution of π given I and is defined based on structure boundaries (as described in more detail herein). Thereafter an EM algorithm is used to solve for θ, which iterates between the E-step (expectation step at 76aa) and the M-step (maximization step at 76ab). Thus, in various embodiments, the E-step and M-step are performed iteratively, such as performed or repeated multiple times, which may be, for example, a determined or defined number of times, a number of times until a convergence is met, etc.

In various embodiments, structure boundary information is used. In particular, the log probability is defined as:

$$\log f(\pi|I) = \log Ce^{-\gamma\Sigma_{k=1}^K F_I(S_k)} = \log C - \gamma\sum_{k=1}^K F_I(S_k), \quad (2)$$

where $F_I(S_k)$ is a potential energy function defined on the boundaries $S_k$ of the $k^{th}$ structure segmented based on π, which typically takes local minimum at edges along structure contours. Additionally, in various embodiments, C is a normalization constant.

In conventional deformable models, $F_I(S_k)$ often does not have an analytical form and minimizing this model does not lead to a closed-form solution. Instead, the model is optimized iteratively by either guiding the contour deformation using force fields in active contours or evolving the level set function using speed functions in level set methods.

In various embodiments, a pseudo level set function is defined as follows:

$$\phi_{jk}=\pi_{jk}-\Sigma_{i\neq k}\pi_{ji}$$

It should be noted that unlike standard level set functions, the values for the pseudo level set function are constrained to [−1, 1]. In particular, $\emptyset_{jk}\in(0, 1]$ when i is inside structure k, and $\emptyset_{jk}\in[-1, 0)$ if i is outside structure k. As in level set methods, the evolution of Ø(j) to maximize Equation 2 can be expressed as follows:

$$\phi_{jk}^{s+1}-\phi_{jk}^s=-\gamma v_j \cdot \nabla \phi_{jk}$$

with $v_j$ being a speed function, and s being the evolution step, and which is equivalent to:

$$\pi_{jk}^{s+1}-\pi_{jk}^s=-\gamma v_j \cdot \nabla \pi_{kj} \quad (3)$$

under the condition that:

$$\Sigma_{k=1}^K \pi_{jk}=1$$

Figure 3:
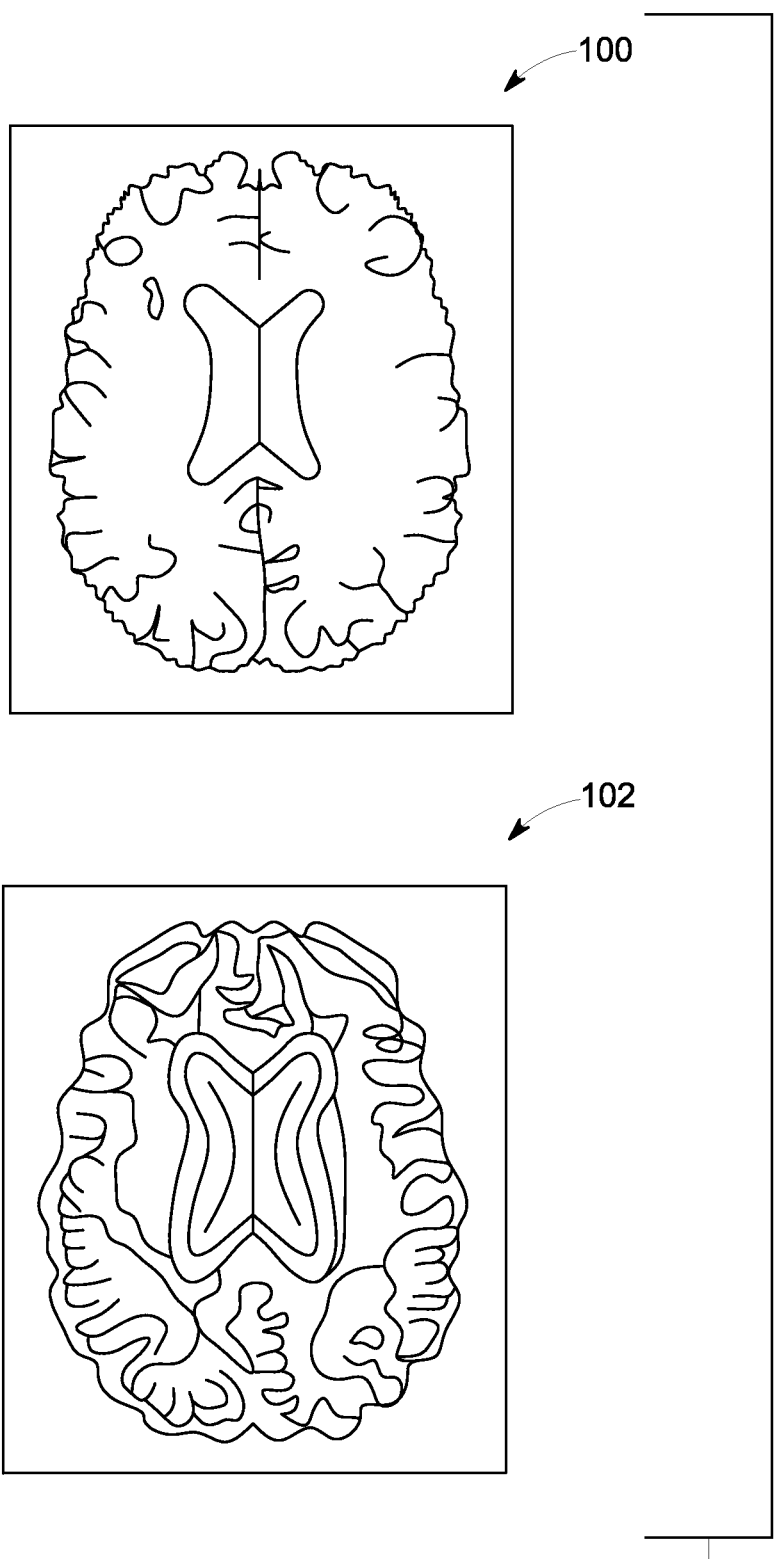
FIG. 3 illustrate exemplary brain images.

In various embodiments, the gradient vector flow (GVF) is used as the speed function. The GVF is computed from the magnitude of target image gradient $\|\nabla \times I\|$ instead of a binary edge map, i.e., $v_j=GV F\{\nabla\|\nabla\times Ij\|\}$. An example is shown in FIG. 3, where the image 100 is a skull-striped brain T1 magnetic resonance (MR) image and the image 102 shows the magnitude of GVF.

In this formulation, $\pi_{jk}$ only evolves in regions where corresponding labels are ambiguous based on spatial priors. For regions with definite labels, the term $\nabla \pi_{kj}$ in Equation 3 equals 0 and thus $\pi_{jk}$ does not evolve.

With respect specifically now to the E-step at 76aa, in this step, the conditional expectation of the log likelihood function is computed. For example, let θ(t) be the set of estimated parameters at iteration t. As in a standard EM algorithm, the conditional expectation is $$Q(\theta \mid \theta^{(t)}) = E\{\log f(I \mid Z, \rho)f(Z \mid \pi)\} + \log f(\pi \mid I) \quad (4)$$

$$= \sum_Z [\log f(I \mid Z, \rho)f(Z \mid \pi)]f(Z \mid I, \theta^{(t)}) + \log f(\pi \mid I)$$

Using Bayes' law and assuming the labels and intensities at voxels are independently distributed, the following results:

$$f(Z \mid I, \theta^{(t)}) = \quad (5)$$

$$\frac{f(I \mid Z, \theta^{(t)})f(Z)}{\sum_{Z'} f(I \mid Z', \theta^{(t)})f(Z')} = \frac{\prod_j \prod_k [f(I_j \mid z_{jk}, \theta^{(t)})p_{jk}]^{z_{jk}}}{\sum_{Z'} \prod_j \prod_k [f(I_j \mid z'_{jk}, \theta^{(t)})p_{jk}]^{z'_{jk}}}.$$

Thus at each voxel j the following is defined:

$$w_{jk}^{(t)} = f(z_{jk}=1 \mid I, \theta^{(t)}) = \frac{f(I_j z_{jk}=1, \theta^{(t)})p_{jk}}{\sum_{k'=1}^{K} f(I_j z_{jk'}=1, \theta^{(t)})p_{jk'}}, \quad (6)$$

where $\omega_{jk}$ is referred as the weighting variable.

The intensity distribution for structure k is defined as:

$$\rho_k^{(t)}(I_j)=f(I_j\mid z_{jk}=1,\theta^{(t)})$$

Then, Equation 4 can be expressed as $$Q(\theta | \theta^{(t)}) = \sum_j \sum_k [\log f(I_j | z_{jk} = 1, \rho k) f(z_{jk} = 1 | \pi_{jk})] w_{jk}^{(t)} + \log f(\pi | I) \quad (7)$$

$$= \sum_j \sum_k w_{jk}^{(t)} \log \rho_k(I_j) \sum_j \sum_k w_{jk}^{(t)} \log \pi_{jk} + \log f(\pi | I).$$

With respect specifically now to the M-step at 76*ab*, in this step, the parameters $\theta^{(t+1)}$ are computed by maximizing $Q(\theta|\theta(t))$.

In particular, to estimate $\rho$, the intensity distribution is modeled using a Parzen window method as follows, where:

$$\sum_j a_{kj} G(x; I_j, \sigma), \text{ where } G(\cdot; I_j, \sigma)$$

is the Gaussian kernel with mean $I_m$ and standard deviation $\sigma \cdot a_{kj}$ are the coefficients such that:

$$\Sigma_j a_{kj} = 1$$

By maximizing Equation 7, the following is derived:

$$\rho_k^{(t+1)} = \underset{\rho_k}{\mathrm{argmax}} \sum_j w_{jk}^{(t)} \log \rho_k(I_j) = \frac{1}{\sum_{j'} w_{j'k}^{(t)}} \sum_j w_{jk}^{(t)} G(x; I_j, \sigma), \quad (8)$$

$$\text{or } a_{kj}^{(t+1)} = w_{jk}^{(t)} / \sum_{j'k} w_{j'k}^{(t)}.$$

To estimate $\pi$, based on Equation 7, the following is derived:

$$\pi^{(t+1)} = \underset{\pi}{\mathrm{argmax}} \sum_j \sum_k w_{jk}^{(t)} \log \pi_{jk} + \log f(\pi | I) \quad (9)$$

with the constraints:

$$\Sigma_k \pi_{jk} = 1 \text{ for all } j, \text{ or } c_j(\pi_{j1}, \ldots, \pi_{jK}) = 1 - \Sigma_k \pi_{jk} = 0$$

As defined herein, the term log f($\pi$|I) does not have an analytical form and thus Equation 9 does not have a closed-form solution. Instead, Equation 9 is solved iteratively using an extended gradient descent method in one embodiment. In particular, let $\pi_j = [\pi_{j1}, \ldots, \pi_{jK}]^T$, and the gradient is denoted as:

$$g(\pi_j) = \nabla_{\pi_j} Q(\theta | \theta^{(t)}) = [g(\pi_{j1}), \ldots, g(\pi_{jK})]^T$$

such that, $$g(\pi_{jk}) = \frac{\partial Q(\theta | \theta^{(t)})}{\partial \pi_{jk}} = \frac{w_{jk}^{(t)}}{\pi_{jk}} - \gamma v_j \cdot \nabla \pi_{kj}. \quad (10)$$

Because of the constraints, $g(\pi_{jk})$ is projected onto the following constrained space:

$$g_N(\pi_k) = g(\pi_k) - \frac{\nabla c_j \cdot g(\pi_k)}{\|g(\pi_k)\|^2} \nabla c_j$$

or equivalently, $$g_N(\pi_{jk}) = g(\pi_{jk}) - \sum_{k=1}^{K} g(\pi_{jk}) / K. \quad (11)$$

At iteration s, the following:

$$\pi_{jk}^{(t+1)s+1}$$

is updated as:

$$\pi_{jk}^{(t+1)s+1} - \pi_{jk}^{(t+1)s} = \delta g_N(\pi_{jk}^{(t+1)s}). \quad (12)$$

where $\delta$ is the small step size, and:

$$\pi_{jk}^{(t+1)0} = \pi_{jk}^{(t)}$$

Thereafter the following is normalized:

$$\pi_{jk}^{(t+1)s+1}$$

to satisfy the constraint that:

$$\Sigma_k \pi_{jk}^{(t+1)s+1} = 1$$

In one embodiment, the deformable atlas module 66 performs the following:

---

Algorithm 1: The deformable atlas algorithm

---

Data: Target image I, prior spatial probability $p_j$
Initialization: Set maximum iterations T and S, set t = 0, $w_{jk}^{(0)} = \pi_{jk}^{(0)} = p_{jk}$;
Compute $v_j$ using GVF and $p_k^{(0)}$ using Eqn. (8);
repeat
    The E-Step: compute $w_{jk}^{(t)}$ as in Eqn. (6);
    The M-Step: compute $p_k^{(t+1)}$ using (8), set s=0, $\pi_{jk}^{(t+1)0} = w_{jk}^{(t)}$;
    repeat
        Compute $\pi_{jk}^{(t+1)s+1}$ using Eqn. (12);
        Normalize $\pi_{jk}^{(t+1)s+1} = \pi_{jk}^{(t+1)s+1} / \Sigma_{k'=1}^{K} \pi_{jk'}^{(t+1)s+1}$;
        s=s+1;
    until it converges or s > S;
    $z_{jk} = 1$ if $\pi_{jk}^{(t+1)} > \pi_{ji}^{(t+1)}$ for all i ≠ $k$, otherwise $z_{jk} = 0$;
    t=t+1;
until the algorithm converges or t > T;

---

Thus, referring again to FIG. 2, the deformable atlas algorithm may be used to generate images with the segmented structures at 78 (e.g., generate and display the target image 52 that has been segmented). As can be seen, and as described herein, the last term in Equation 9 (log f($\pi$|I)) is based on a cost function of a deformable atlas model method. Additionally, the iterative update in various embodiments is performed by repeating the calculations in Equations 10-12.

Various embodiments were tested on Alzheimer's disease brains using the Australian Imaging, Biomarkers and Lifestyle (AIBL) data sets. For comparison, experiments were performed using three methods: majority voting (MV), intensity weighted voting (IWV), and deformable atlas as described herein. For MV, the segmentation was determined by fusing propagated label maps without considering image cues, i.e., j was labeled as k if $p_{jk} > p_{ji}$ for $\forall i \neq k$. IWV improves MV by considering structure-specific intensity profiles, i.e., the intensity weighting f(I|Z,$\rho$) in Equation 1 was applied, but the term for structure boundary $f(\pi|I)$ was ignored. For the deformable atlas approach of various embodiments, both the intensity weighting and the structure boundary term were applied. The parameters were empirically selected: $\gamma=0.5$ and $\delta=0.05$. Moreover, $\sigma$ in Equation 8 was chosen as the intensity standard deviation of all voxels in each structure. In all experiments, the image registration was performed using SyN method.

Figure 4:
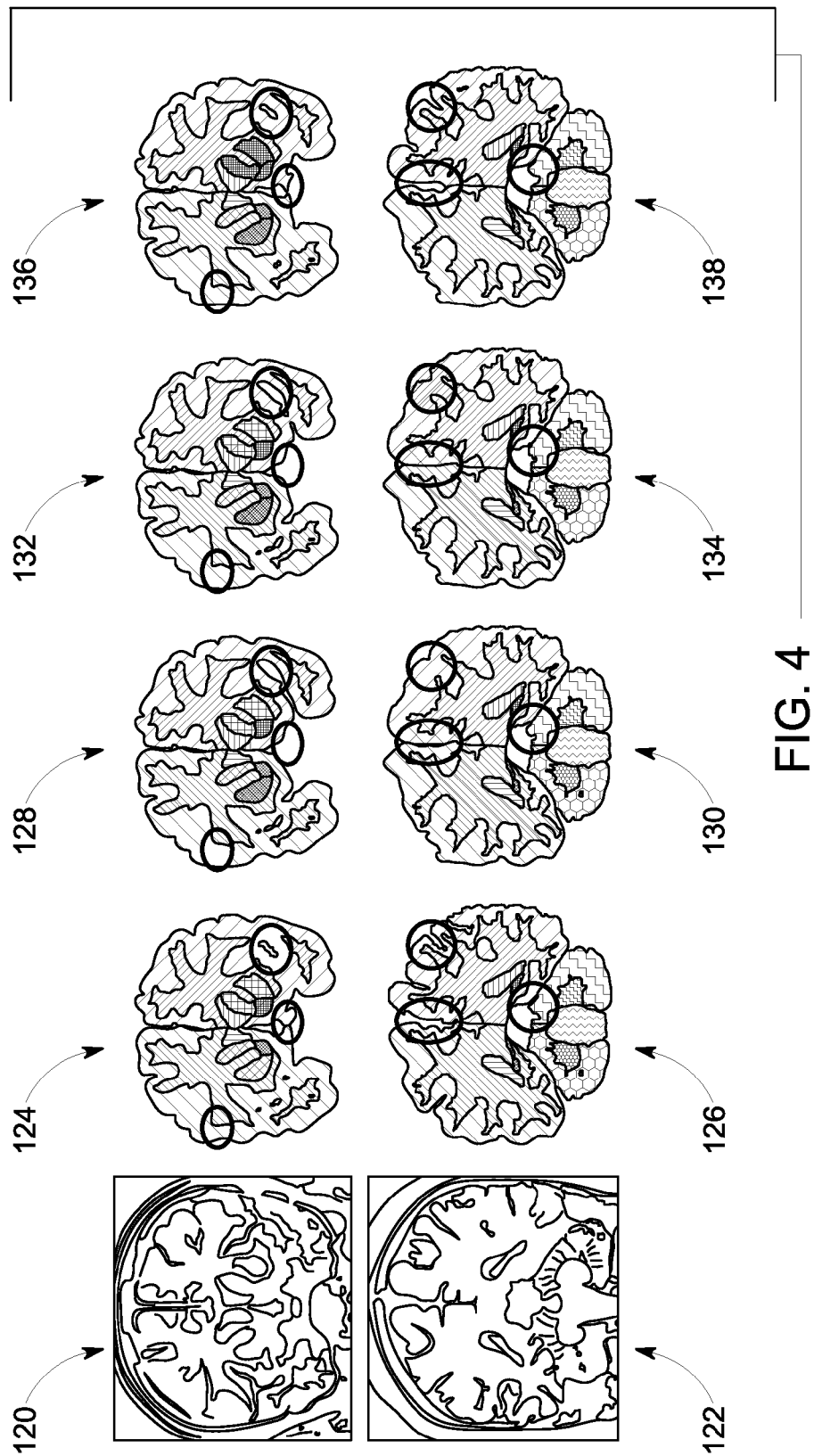
FIG. 4 illustrates images showing image segmentation using different methods including a deformable atlas method of various embodiments.
Figure 5:
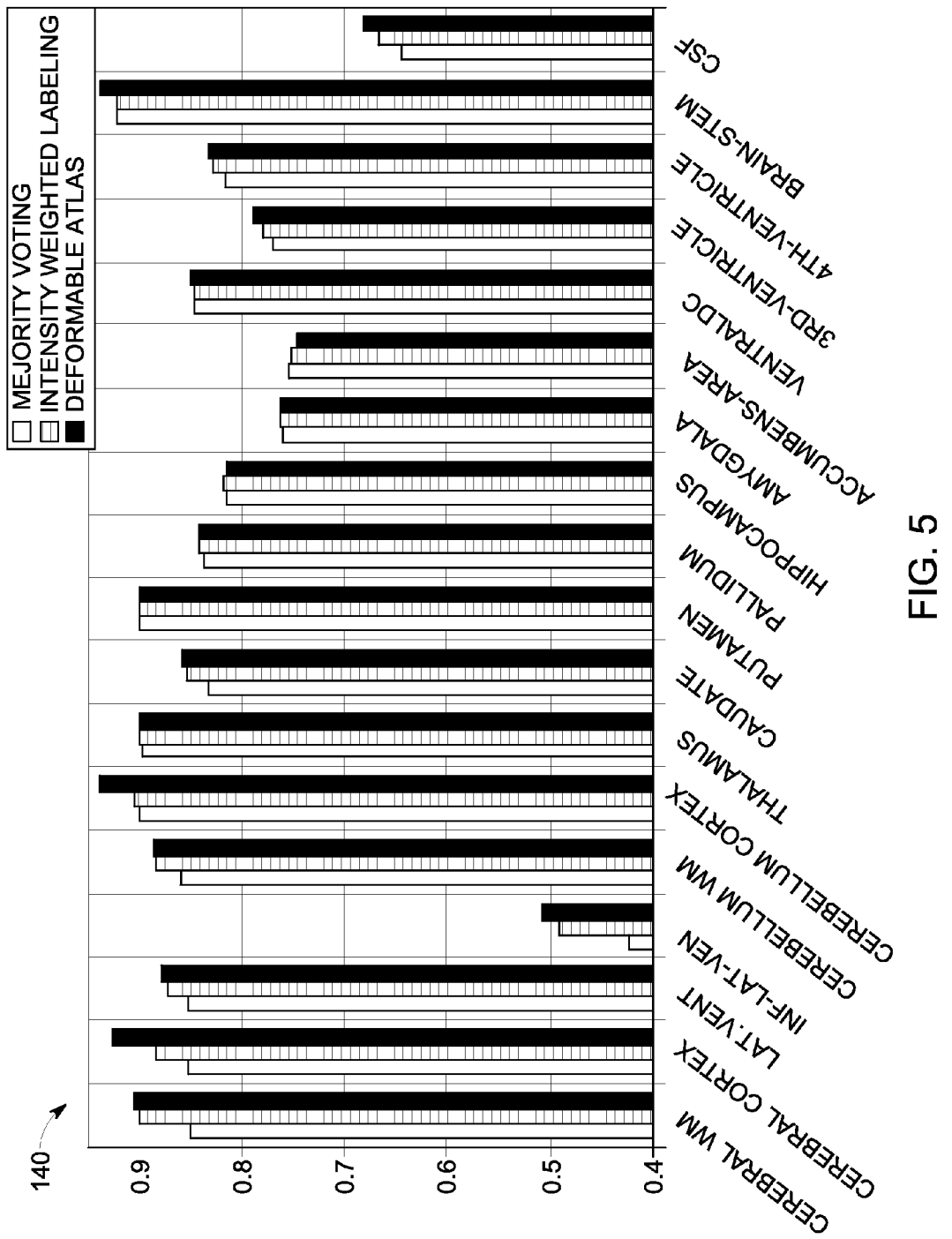
FIG. 5 is a graph showing segmentation results using different methods including a deformable atlas method of various embodiments.

For Internet Brain Segmentation Repository (IBSR) data, there were a total of 18 ISBR data and 18 experiments were performed using a multi-atlas approach. For each experiment, one image was selected as the target image and the other 17 images were used as the atlases. The segmentation results were compared to the manual segmentation and evaluated using the Dice coefficient, i.e., $D=2|X \cap Y|/|X \cup Y|$ where X and y are the voxel sets of manual labeling and automated segmentation result, respectively, and $|\bullet|$ is the set cardinality. FIG. 4 shows the qualitative results on two data sets, and FIG. 5 shows the quantitative results for all structures. It should be noted that left and right structures are combined for clarity.

FIG. 4 shows the results performed using the IBSR data set, which contains 18 healthy subjects with T1 weighted images, and 32 brain structures were manually delineated on each image by experts. In particular, the images 120, 122 are T1-weighted coronal slices, the images 124, 126 are results from ground truth analysis, the images 128, 130 are results from MV analysis, the images 132, 134 are results from IWV analysis, and the images 136, 138 are results using various embodiments. The improvements are illustrated by the circles that show the corresponding regions on each of the images. As can be seen, using various embodiments, better segmentation of structures within the brain, particularly within the circle regions, is provided.

Moreover, as can be seen in the graph 140 of FIG. 5, IWV performed better than MV in most structures, which demonstrated the effectiveness of incorporating intensity into the voting strategy. Using the deformable atlas approach of various embodiments further improved the results, especially in the ventricles and the cortex, and also performed better or similarly on other structures.

Figure 6:
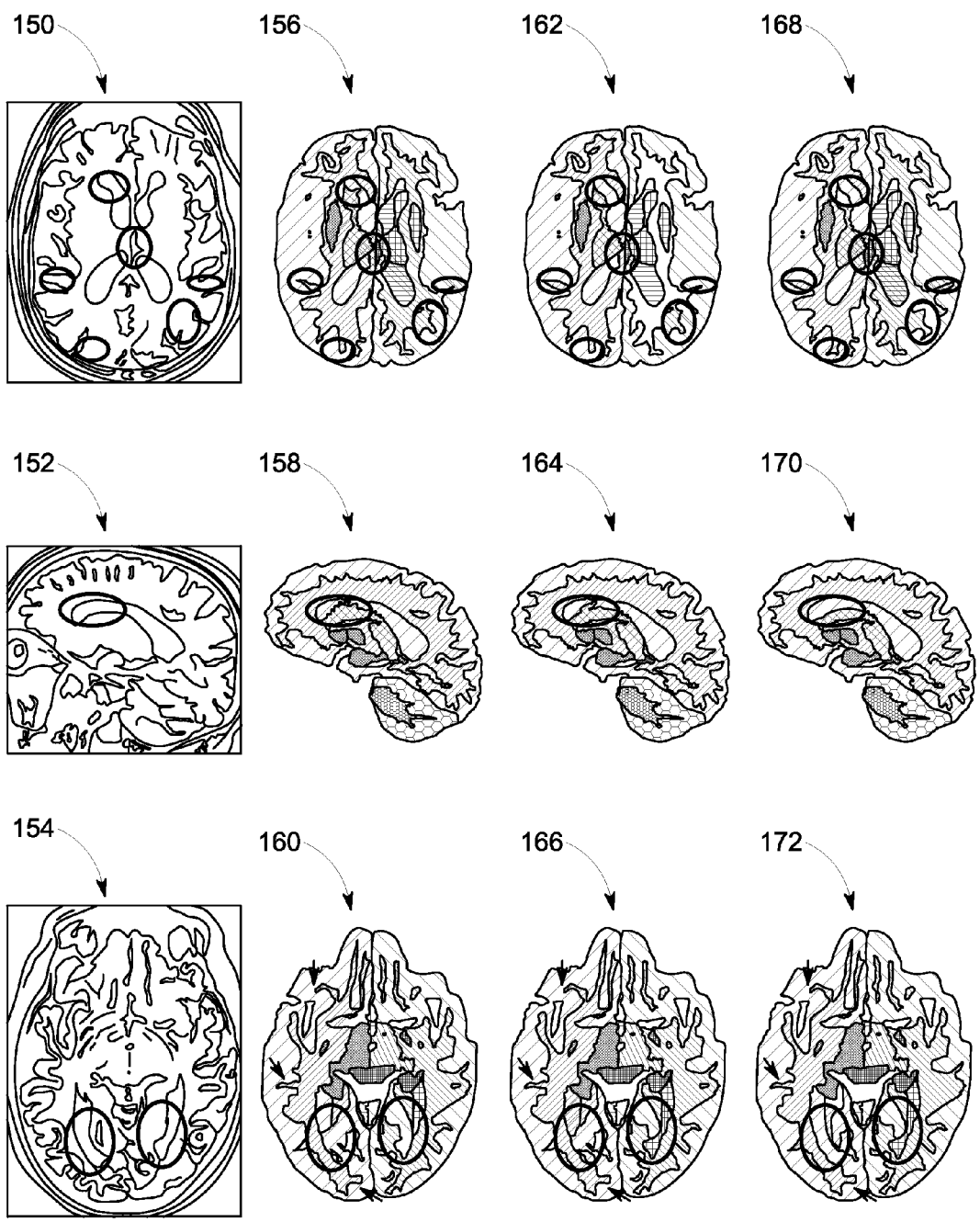
FIG. 6 illustrates images showing image segmentation using different methods including a deformable atlas method of various embodiments.

Various methods were also performed on 45 AIBL images having Alzheimer's disease with the 18 IBSR data as the atlases. The results are shown in FIG. 6 wherein the images 150, 152, 154 are the T1-weighted images, the images 156, 158, 160 are the results of MV analysis, the images 162, 164, 166 are the results of ITW analysis, and the images 168, 170, 172 are the results using various embodiments. The images are the results for three subjects. As can be seen, particularly in the circled regions, the deformable atlas approach consistently performs better than MV and IWV by identifying more structures.

In particular, because the diseased brains have large anatomical changes as compared to normal brains, e.g., brain tissue shrinkage and ventricle enlargement, and the atlas images were all on normal brains, these pathological differences were not captured by the registration algorithm and resulted in failure of MV and IWV on certain parts of the brain (circled regions in FIG. 6). However, the deformable atlas approach of various embodiments performed well despite the anatomical changes, based in part on the edge-based deformation. These results illustrate that the deformable atlas method of various embodiments may be applied to brains with large deformation that may not be properly segmented using, for example, voting based methods.

Thus, in various embodiments, a deformable atlas method for multi-structure segmentation is provided that combines atlas-based and image-based approaches, and applies the method, for example, to segment both normal brains and brains with Alzheimer's disease. However, it should be appreciated that the various embodiments may be implemented with different structures or organs. For example, the results described herein show that various embodiments performed well particularly for diseased brain in spite of large anatomical deformation while other segmentation methods failed. However, the various embodiments can be readily extended to other applications, such as of atlas-based segmentation, e.g., prostate and heart.

It should be noted that although the various embodiments are described in connection with a multi-atlas approach, the various embodiments may be applied, for example, to probabilistic atlas approaches. It also should be noted that variations and modifications are contemplated, for example, to include other speed functions, including curvature-based terms for smoothness.

Figure 7:
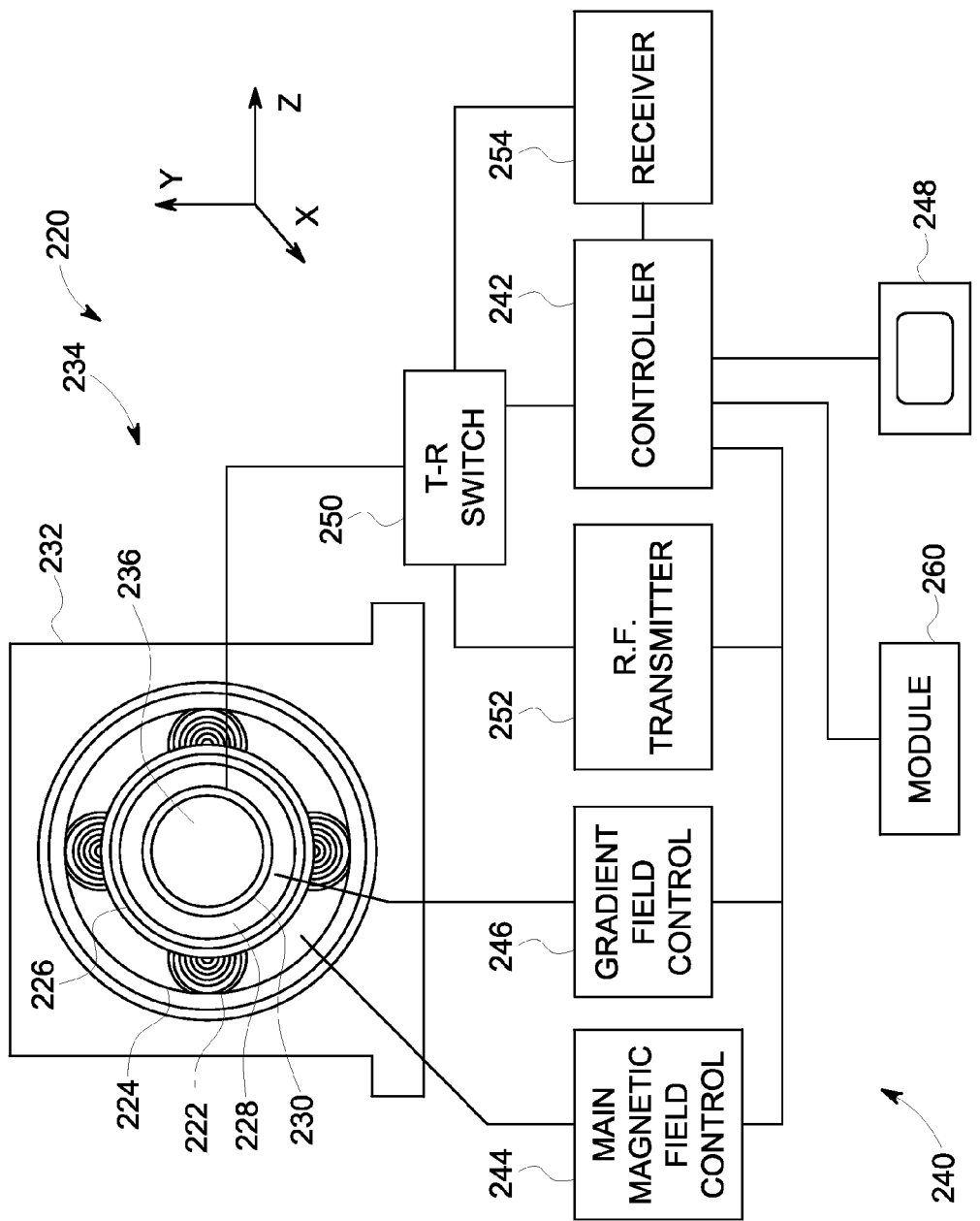
FIG. 7 is a block diagram of a Magnetic Resonance Imaging (MRI) system formed in accordance with various embodiments.

Accordingly, various embodiments provide image segmentation, wherein the resulting images may be used, for example, in medical diagnosis. The various embodiments may be implemented in connection with an MRI system 220 as shown in FIG. 7, which may be used to acquire MRI data that is segmented to generate images as described herein. Thus, the MRI system 220 may be utilized, for example, to implement the method 70 described herein.

In the exemplary embodiment, the MRI system 220 includes a superconducting magnet 222 formed from magnetic coils that may be supported on a magnet coil support structure. However, in other embodiments, different types of magnets may be used, such as permanent magnets or electromagnets. A vessel 224 (also referred to as a cryostat) surrounds the superconducting magnet 222 and is filled with liquid helium to cool the coils of the superconducting magnet 222. A thermal insulation 226 is provided surrounding the outer surface of the vessel 224 and the inner surface of the superconducting magnet 222. A plurality of magnetic gradient coils 228 are provided within the superconducting magnet 222 and a transmitter, for example, an RF transmit coil 230 is provided within the plurality of magnetic gradient coils 228. In some embodiments the RF transmit coil 230 may be replaced with a transmit and receive coil defining a transmitter and receiver.

The components described above are located within a gantry 232 and generally form an imaging portion 234. It should be noted that although the superconducting magnet 222 is a cylindrical shaped, other shapes of magnets can be used.

A processing portion 240 generally includes a controller 242, a main magnetic field control 244, a gradient field control 246, a display device 248, a transmit-receive (T-R) switch 250, an RF transmitter 252 and a receiver 254. In the exemplary embodiment, a deformable atlas module 260, which may be embodied as the deformable atlas module 66 (shown in FIG. 1), may be implemented as a tangible non-transitory computer readable medium, and is programmed to segment images as described in more detail herein.

In operation, a patient is inserted into a bore 236 of the MRI system 220. The superconducting magnet 222 produces an approximately uniform and static main magnetic field $B_0$ across the bore 236. The strength of the electromagnetic field in the bore 236 and correspondingly in the patient, is controlled by the controller 242 via the main magnetic field control 244, which also controls a supply of energizing current to the superconducting magnet 222.

The magnetic gradient coils 228, which include one or more gradient coil elements, are provided so that a magnetic gradient can be imposed on the magnetic field $B_0$ in the bore 236 within the superconducting magnet 222 in any one or more of three orthogonal directions x, y, and z. The magnetic gradient coils 228 are energized by the gradient field control 246 and are also controlled by the controller 242.

The RF transmit coil 230, which may include a plurality of coils (e.g., resonant surface coils), is arranged to transmit magnetic pulses and/or optionally simultaneously detect MR signals from the patient if receivers, such as receive coil elements are also provided, such as a surface coil (not shown) configured as an RF receive coil. The RF transmit coil 230 and the receive surface coil are selectably interconnected to one of the RF transmitter 252 or the receiver 254, respectively, by the T-R switch 250. The RF transmitter 252 and T-R switch 250 are controlled by the controller 242 such that RF field pulses or signals are generated by the RF transmitter 252 and selectively applied to the patient for excitation of magnetic resonance in the patient.

Following application of the RF pulses, the T-R switch 250 is again actuated to decouple the RF transmit coil 230 from the RF transmitter 252. The detected MR signals are in turn communicated to the controller 242. The detected signals are then utilized to determine electrical properties of the object (e.g., patient) being imaged. The processed signals representative of an image are also transmitted to the display device 248 to provide a visual display of the image.

The various embodiments may be implemented in connection with different types of superconducting coils, such as superconducting coils for an MRI system. For example, the various embodiments may be implemented with superconducting coils for use with an MRI system 220 shown in FIG. 7. It should be appreciated that although the system 220 is illustrated as a single modality imaging system, the various embodiments may be implemented in or with multi-modality imaging systems. The system 220 is illustrated as an MRI imaging system and may be combined with different types of medical imaging systems, such as a Computed Tomography (CT), Positron Emission Tomography (PET), a Single Photon Emission Computed Tomography (SPECT), as well as an ultrasound system, or any other system capable of generating images, particularly of a human. Moreover, the various embodiments are not limited to medical imaging systems for imaging human subjects, but may include veterinary or non-medical systems for imaging non-human objects, luggage, etc.

It should be noted that the particular arrangement of components (e.g., the number, types, placement, or the like) of the illustrated embodiments may be modified in various alternate embodiments. In various embodiments, different numbers of a given module or unit may be employed, a different type or types of a given module or unit may be employed, a number of modules or units (or aspects thereof) may be combined, a given module or unit may be divided into plural modules (or sub-modules) or units (or sub-units), a given module or unit may be added, or a given module or unit may be omitted.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optical drive, and the like. The storage device may also be other similar means for loading computer programs or other instructions into the computer or processor.

As used herein, the term "computer," "controller," and "module" may each include any processor-based or microprocessor-based system including systems using microcontrollers, reduced instruction set computers (RISC), application specific integrated circuits (ASICs), logic circuits, GPUs, FPGAs, and any other circuit or processor capable of executing the functions described herein. The above examples are exemplary only, and are thus not intended to limit in any way the definition and/or meaning of the term "module" or "computer."

The computer, module, or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer, module, or processor as a processing machine to perform specific operations such as the methods and processes of the various embodiments described and/or illustrated herein. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program. The individual components of the various embodiments may be virtualized and hosted by a cloud type computational environment, for example to allow for dynamic allocation of computational power, without requiring the user concerning the location, configuration, and/or specific hardware of the computer system.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal languages of the claims.

What is claimed is:

1. A non-transitory computer readable storage medium for segmenting an image using a processor, the non-transitory computer readable storage medium including instructions to command the processor to:
   obtain one or more target images;
   obtain one or more propagated label probabilities for the one or more target images;
   segment the one or more target images using a cost function of a deformable atlas model; and
   identify segmented structures within the one or more target images based on the segmented one or more target images;
   wherein the deformable atlas model utilizes structure boundary information to take local minimum intensities at edges along a structure contour;
   wherein the instructions command the processor to use the following to segment the one or more images:

$$\pi^{(t+1)} = \underset{\pi}{\operatorname{argmax}} \sum_j \sum_k w_{jk}^{(t)} \log \pi_{jk} + \log f(\pi \mid I)$$

wherein log f (π|I) is a deformable atlas model term.

2. The non-transitory computer readable storage medium of claim 1, wherein the instructions command the processor to perform an Expectation-Maximization (EM) algorithm for the cost function.

3. The non-transitory computer readable storage medium of claim 2, wherein the EM algorithm is performed iteratively.

4. The non-transitory computer readable storage medium of claim 1, wherein the instructions command the processor to determine a log probability for the deformable atlas model.

5. The non-transitory computer readable storage medium of claim 1, wherein the instructions command the processor to perform a multi-atlas based segmentation using the cost function of the deformable atlas model.

6. The non-transitory computer readable storage medium of claim 1, wherein the instructions command the processor to use an intensity weighting and a structure boundary term for the deformable atlas model.

7. A Magnetic Resonance Imaging (MRI) system comprising:
   an MRI imaging system to acquire one or more target images of an object; and
   a processor to determine one or more propagated label probabilities for the one or more target images, the processing portion further comprising a deformable atlas module to segment the one or more target images using a cost function of a deformable atlas model to identify segmented structures within the one or more target images based on the segmented one or more target images; wherein the deformable atlas model utilizes structure boundary information to take local minimum intensities at edges along a structure contour
   wherein the deformable atlas module is a tangible non-transitory computer readable medium that further uses the following to segment the one or more images:

$$\pi^{(t+1)} = \underset{\pi}{\operatorname{argmax}} \sum_j \sum_k w_{jk}^{(t)} \log \pi_{jk} + \log f(\pi \mid I)$$

wherein log f (π|I) is a deformable atlas model term.

8. The MRI system of claim 7, wherein the deformable atlas module further performs an Expectation-Maximization (EM) algorithm for the cost function.

9. The MRI system of claim 8, wherein the EM algorithm is performed iteratively.

10. The MRI system of claim 7, wherein the deformable atlas module further determines a log probability for the deformable atlas model.

11. The MRI system of claim 7, wherein the deformable atlas module further performs a multi-atlas based segmentation using the cost function of the deformable atlas model.

12. The MRI system of claim 7, wherein the deformable atlas module further uses an intensity weighting and a structure boundary term for the deformable atlas model.

13. A method for image segmentation, the method comprising:
   obtaining one or more target images;
   obtaining one or more propagated label probabilities for the one or more target images;
   segmenting the one or more target images using a cost function of a deformable atlas model; and
   identifying segmented structures within the one or more target images based on the segmented one or more target images;
   wherein the deformable atlas model utilizes structure boundary information to take local minimum intensities at edges along a structure contour;
   wherein the deformable atlas module further uses the following to segment the one or more target images:

$$\pi^{(t+1)} = \underset{\pi}{\operatorname{argmax}} \sum_j \sum_k w_{jk}^{(t)} \log \pi_{jk} + \log f(\pi \mid I)$$

wherein log f(π|I) is a deformable atlas model term.

14. The method of claim 13, further comprising performing an Expectation-Maximization (EM) algorithm for the cost function.

15. The method of claim 14, wherein the EM algorithm is performed iteratively.

16. The method of claim 13, further comprising determining a log probability for the deformable atlas model.

17. The method of claim 13, further comprising performing a multi-atlas based segmentation using the cost function of the deformable atlas model.

18. The method of claim 13, further comprising using an intensity weighting and a structure boundary term for the deformable atlas model.

* * * * *